Jan. 5, 1932.   C. DAVIES, JR   1,839,741
FUEL UTILIZATION
Filed Aug. 16, 1922   2 Sheets-Sheet 1

INVENTOR.
Caleb Davies Jr
BY
Fay, Oberlin & Fay
ATTORNEYS

Jan. 5, 1932.  C. DAVIES, JR  1,839,741
FUEL UTILIZATION
Filed Aug. 16, 1922  2 Sheets-Sheet 2

INVENTOR.
Caleb Davies Jr.
BY
Fay, Oberlin + Fay
ATTORNEYS

Patented Jan. 5, 1932

1,839,741

UNITED STATES PATENT OFFICE

CALEB DAVIES, JR., OF POLAND, OHIO

FUEL UTILIZATION

Application filed August 16, 1922. Serial No. 582,174.

The present improvements relate more particularly to a method of and apparatus for the recovery of by-products from coal or other like fuels by effecting destructive distillation thereof by means of the sensible heat in a current of hot gas, brought into contact with such fuel under new conditions. Carbonizing by means of sensible heat of hot gas current has been attempted in the past, but certain difficulties are inherent unless avoided by special means designed to secure contact of the gas stream with all the fuel particles.

In the present invention, I largely surmount these difficulties by passing the gas through a relatively thin layer of fuel supported on a grate. The latter may either be stationary a portion of the time and the operation intermittent or else such grate may be movable continuously. An important, although in one sense incidental feature, is the carrying out of the above-described type of destructive distillation in the same mechanism and practically within the same furnace as the combustion of the residual solid fuel, i. e., in connection with the combustion of the fuel in furnaces of more or less standard construction such as are used for steam raising or other analogous purposes. I thus render possible, in a single self-contained mechanism on the order of a furnace, the utilization of fuel such as coal, wood, oil, shale, etc., both for the recovery of by-products of such fuel, which are too valuable to be economically employed or rather wasted in the combustion process proper, and to generate heat for steam raising or like useful purpose by combustion of the so called carbonized residue as it is formed.

To the accomplishment of the foregoing and related ends, the invention, then, consists of the steps and means hereinafter fully described and particularly pointed out in the claims, the annexed drawings and the following description setting forth in detail certain means and one mode of carrying out the invention, such disclosed means and mode illustrating, however, but several of the various ways in which the principle of the invention may be used.

In said annexed drawings:—

Figure 1:
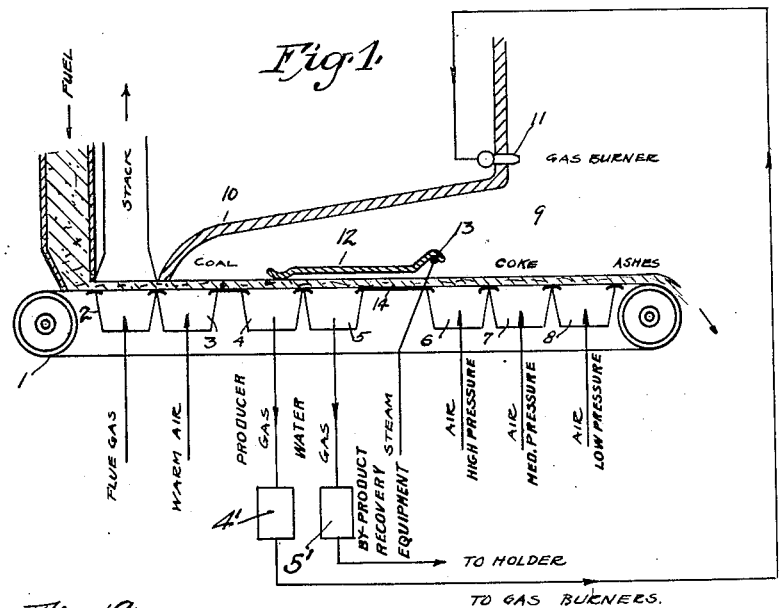
Figure 1A:
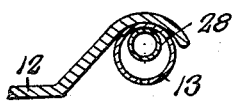
Figure 2:
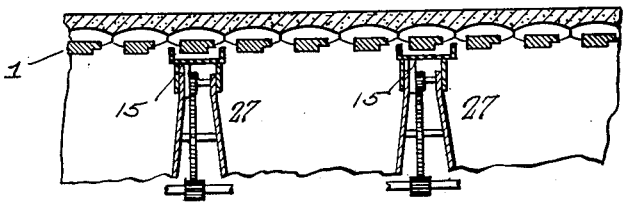
Figure 3:
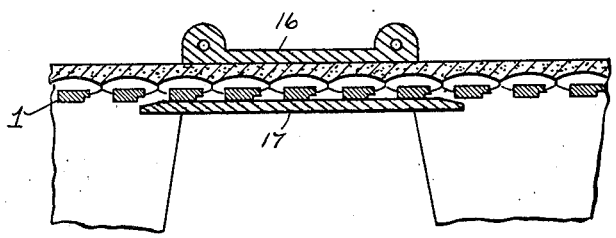
Figure 4:
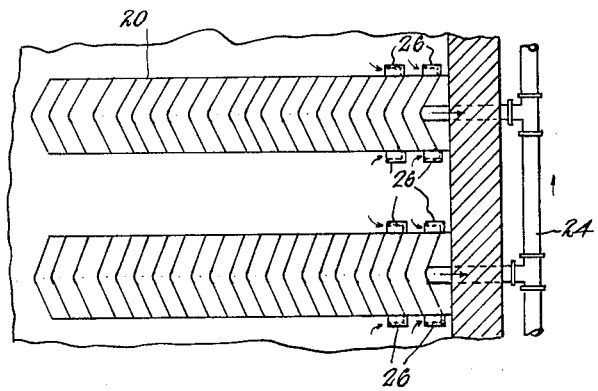
Figure 5:
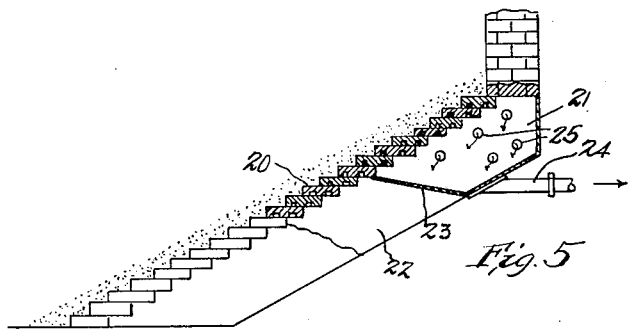
Figure 6:
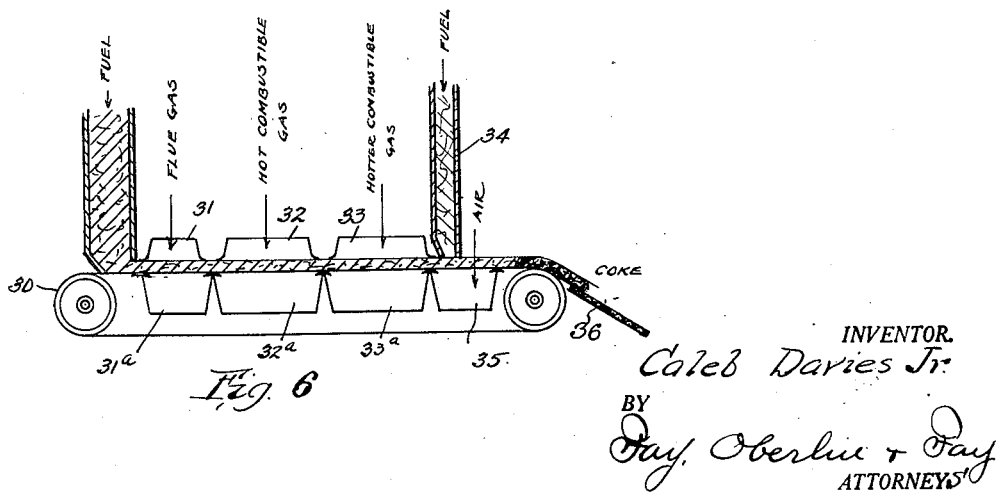

Fig. 1 is a central longitudinal section, diagrammatic in character, of a typical furnace such as used in steam raising, for example, wherein my present improvements are incorporated, the manner of operation being indicated after the fashion of a flow sheet; Fig. 1ª is a fragmentary cross-sectional view, on a larger scale, showing the steam pipe and encased hot water pipe for spraying the fuel; Figs. 2 and 3 are similar detail views, on a somewhat larger scale, showing modifications in the construction of the grate used in such furnace; Fig. 4 is a plan view, diagrammatic in character, showing the adaptation of my present improvements to another type of furnace, viz., wherewith an underfeed stoker is employed; Fig. 5 is a partial side elevation and partial longitudinal section of the furnace shown in Fig. 4; while Fig. 6 is a view similar to that of Figs. 1 and 5, but showing the adaptation of my improvements to a so-called Dwight-Lloyd sintering machine.

In the construction illustrated in Fig. 1, the coal or equivalent fuel is designed to be fed onto a chain grate 1, which travels over a series of separate compartments 2 to 8, inclusive, which compartments are thus adapted to control the flow of air or gases through the surface of the upper strand of the grate.

The number of these compartments and their particular arrangement, as well as the functions which they severally subserve, may be considerably varied, as will be explained in connection with the description of modified forms of the invention. However, as shown in such Fig. 1, the first compartment 2 over which the layer of coal is passed, is arranged to discharge a flue gas of suitable temperature through the fuel, such gas being of such temperature and rate of flow as to heat the fuel to a temperature slightly below that at which volatilization of combustible constituents would begin.

The preheated coal then passes into a combustion chamber 9 defined in front by a furnace arch 10, which is preferably low, so as to substantially contact at its front edge with the upper surface of the moving layer of fuel. The second compartment 3 is the first that lies under such combustion chamber, i. e., back of the arch, and is arranged to supply air to the coal at about the same temperature as the flue gas in the preceding compartment. Combustion is started at the upper surface of the coal at this point in the usual manner, but it should be noted that the whole mass of coal between the burning top surface and the grate itself is at a temperature only slightly below that at which destructive distillation begins.

The coal next passes over compartment 4, which is a suction compartment, so that the products of combustion from the burning top layer will be drawn downward through the preheated coal and thence through the grate. These hot gaseous combustion products are thus drawn down through the coal at such a rate as to give time for the reduction of most of the carbon-dioxide to carbon-monoxide, in accordance with the well known producer gas reaction. At the same time the hot producer gas passing through the lower portions of the coal layer causes destructive distillation and picks up tar and ammonia vapors in a manner similar to the low temperature distillation types of by-product gas producers. Owing, however, to the preheating of the coal, there is practically no condensation of the tar vapors in the lower part of the fuel bed and due to this fact, together with the uniform distribution of the fuel in a thin layer across the whole width of the chain grate, most of the difficulty which has been experienced with by-product gas producers operating on bituminous coal with strong coking characteristics is obviated.

The gas received from such suction compartment 4 is drawn off to the usual type of by-product recovery equipment 4' and may then be returned to a suitable burner 11 in the furnace 9 for use as an auxiliary fuel under the boiler or may be employed for any other purpose for which producer gas is suited. The suction compartment 4 and mains connected therewith are of course flushed with tar and liquor as in a gas plant.

Before the fuel layer on the grate is passed beyond such first suction compartment 4, it is carried under a horizontal slab 12 of refractory material which may be made up of long tiles of suitable shape resting at one end on the fuel, while the other end is supported on a transverse steam pipe 13. The latter may be supported by an internal hot water pipe 28, or sufficient steam flow may be maintained therethrough to prevent same from overheating and bending. In either event, such steam pipe is perforated so as to discharge a small amount of steam over the fuel as it passes out from under slab or tile cover 12. Nearly all of the horizontal portion of such cover is within a fraction of an inch of the surface of the fuel and, as indicated, the fuel when it first passes thereunder is still over the first suction compartment 4. Next while still under such cover the fuel layer passes over a second compartment 5, which is likewise a suction compartment, and then over a dead plate 14 before passing under said steam pipe 13 and thence out from under the cover. Most or all of the stream from said pipe 13 passes horizontally through the fuel bed over plate 14 and into the second suction compartment 5 with formation of water gas. Under certain operating conditions this water gas will complete the destructive distillation of the lower layers of the fuel and it will be enriched by the resultant distillation gases; while with relatively high suction in such compartment 5 and relatively small steam flow, the water gas will be mixed with considerable quantities of producer gas. Such water gas is passed through by-product recovery equipment 5' similar to that in which the products drawn off through compartment 4 are passed and thereupon the gas goes to a gas holder (not shown) to be employed in any desired manner.

Upon passing out from under cover 12 the fuel layer immediately passes over compartment 6, to which air is supplied under pressure, so that the usual type of combustion is resumed in such layer. The fuel at this stage consists principally of hot coke, usually with a thin layer of coal on the bottom next to the grate, since the gasifying action just described proceeds from the top downward and is preferably carried not quite to completion. A thin layer of incompletely carbonized coal, in other words, should be left to protect the grate from overheating. The succeeding compartments 7 and 8 are likewise air pressure compartments, preferably having progressively diminished pressure.

The general principle of operation, as well as the succession of steps involved in my improved process, are, it is believed, sufficiently indicated in connection with the foregoing description of the mechanism or apparatus shown in Fig. 1. Various modifications and changes, however, may be made in the steps in question; thus, water gas may be recovered without making producer gas, or vice versa, or both water gas and producer gas may be mixed in the same suction chamber and taken off together. Carbon-dioxide or hot gas or air may be used instead of, or in addition to, the steam under the cover 12.

With certain kinds of coal, by passing large quantities of hot air through the fuel immediately before it enters the combustion chamber, sufficient oxidation is caused to destroy the coking characteristics and thus make faster operation possible. With western Pennsylvania coals, however, this would be impractical owing to the excessive time required for such oxidation, if carried out below the temperature of destructive distillation. Accordingly, the first air compartment 3 may be used or omitted, depending upon fuel conditions encountered, and similarly the flue gas compartment 2 may be omitted under certain conditions.

While such flue gas is shown in Fig. 1 as being passed upwardly through the layer of fuel on the grate, the direction of such passage may be reversed. Indeed it will be preferable to pass such gas downwardly through the fuel in case the preheating is inadequate, causing condensation of moisture from the outgoing gases.

When high suctions are required in certain compartments, the travel of the grate may be made intermittent by any suitable mechanism and seals, which may be raised or lowered, employed to separate the compartments from each other, sealing the bottoms of the transverse members of the grate when the latter is temporarily held stationary. In such case the travel of the grate will consist of a series of short rapid movements at considerable time intervals. The seals 15, as shown in Fig. 2, are designed to be lowered immediately before the movement of the grate begins and raised into position as soon as such movement stops by means of suitable cam mechanism 27 which may be connected by any suitable timing mechanism with the intermittent motion mechanism of the grate.

In Fig. 3 there is illustrated a modification in the construction of the tile cover 12 shown in Fig. 1, such modified cover 16 being disposed to more closely contact with the upper surface of the fuel layer and lying entirely over a dead plate 17, similar to plate 14, disposed beneath the section of the grate whereon such fuel layer is supported. The flow of gases will accordingly be entirely horizontal, the hot steam or other oxidizing gas being caused to pass from one end of the cover horizontally through the hot fuel and collected and removed at the other end of such cover.

The same principle may be applied to underfeed stokers, as illustrated in Figs. 4 and 5, where I show a grate 20 of the type employed in the so-called multiple piston Taylor stoker. The upper part 21 of the tuyère box 22 is blanked off as by a partition 23 and connected with a suction line 24 with the result that products of combustion from the interior of the furnace will be drawn through the green fuel into the suction compartments at the tops of the several tuyère boxes, thus enabling producer gas, tar and ammonia to be recovered. In the construction just described, the perforations 25 in the tuyère boxes instead of being at the front will be in the sides and hoods 26 will be provided on the furnace at the sides thereof.

Still another modification is shown in Fig. 6, which represents a modified Dwight-Lloyd sintering machine, wherein the coal is fed onto one end of a chain or equivalent traveling grate 30 and discharged as coke from the other end. A series of compartments 31, 32 and 33 are positioned over the top of the stream of fuel, a corresponding series of suction compartments 31a, 32a and 33a being placed therebeneath. By means of the first vertical pair of compartments 31, 31a, flue gas is passed downward through the fuel, preheating it as in the construction shown in Fig. 1. By means of the next vertical pair of compartments 32, 32a, a large quantity of preheated combustible gas is passed downwardly through the fuel, bringing about most of the carbonization. This gas is preferably passed through the by-product recovery plant and most of it is circulated back through preheating equipment and thence again through the fuel. The last vertical pair of compartments 33, 33a, serves to carry a relatively small quantity of much hotter gas through the fuel, thus completing carbonization. So long as the heat capacity of this last mentioned gas stream is less than that of the fuel stream, the heat transfer will take place at first mostly at the top of the fuel bed and the bottom of the fuel bed will not reach the inlet gas temperature unless the action is continued too far. Where complete carbonization is required, a thin layer of finely divided coal or coke is then fed onto the stream of fuel from a supply duct or hopper 34 and burned with the down draft produced by a suction compartment 35 or otherwise, in the usual way, thereby completing carbonization. The finished coke is then discharged onto a suitable screen 36 and quenched.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:

1. In a method of utilizing fuel, the steps which consist in subjecting a given section of a layer of such fuel successively, by means of independent gaseous currents, to drying action, to partial combustion, and then to partial gasification first by drawing products of combustion through such layer and next by passing steam through such layer.

2. In a method of utilizing fuel, the steps which consist in subjecting a given section of a layer of such fuel successively, by means of independent gaseous currents, to drying action, to partial combustion, and then to partial gasification first by drawing products of combustion from the preceding step through such layer and next by passing steam through such layer.

3. In a method of utilizing fuel, the steps which consist in subjecting a given section of a layer of such fuel successively, by means of independent gaseous currents, to drying action, to partial combustion, then to partial gasification first by drawing products of combustion through such layer and next by passing steam through such layer, and finally subjecting the fuel to complete combustion.

4. In a method of utilizing fuel, the steps which consist in subjecting a given section of a layer of such fuel successively, by means of independent gaseous currents, to drying action, to partial combustion, then to partial gasification first by drawing products of combustion from the preceding step through such layer and next by passing steam through such layer, and finally subjecting the fuel to complete combustion.

5. In a method of utilizing fuel, the steps which consist in subjecting a given section of a layer of such fuel successively, by means of independent gaseous currents, to the drying action of flue gas, to partial combustion, to partial gasification produced by drawing products of combustion through such layer, to further gasification by passing steam through such layer, and finally to complete combustion.

6. In a method of utilizing fuel, the steps which consist in subjecting a given section of a layer of such fuel successively, by means of independent gaseous currents, to the drying action of flue gas, to partial combustion, to partial gasification produced by drawing products of combustion from the preceding step through such layer, to further gasification by passing steam through such layer, and finally to complete combustion.

7. In a method of utilizing fuel by bringing the same progressively into contact with independent gaseous currents, the steps which consist first in making producer gas from a portion thereof, then in making water gas from residual fuel intimately mixed with said first portion, and finally in subjecting the residium of such portion of fuel to complete combustion, such producer gas being burned to supplement such combustion step.

8. In a furnace for heating boilers and the like, the combination of a chain grate, means for supplying fuel to said grate at the forward end thereof, a series of compartments disposed beneath said grate in contact with successive sections thereof, the first of said compartments lying forwardly of the furnace chamber proper and being connected with a supply of flue gas and the first and last compartments lying within such chamber being connected with a supply of air whereby combustion of the fuel on said grate may be initiated and completed over such compartments respectively, and means associated with an intermediate compartment for independently drawing downwardly through the fuel the products of combustion from such initial combustion stage.

9. In a furnace for heating boilers and the like, the combination of a chain grate, means for supplying fuel to said grate at the forward end thereof, a series of compartments disposed beneath said grate in contact with successive sections thereof, the first of said compartments lying forwardly of the furnace chamber proper and being connected with a supply of flue gas and the first and last compartments lying within such chamber being connected with a supply of air whereby combustion of the fuel on said grate may be initiated and completed over such compartments respectively, means associated with an intermediate compartment for independently drawing downwardly through the fuel the products of combustion from such initial combustion stage, and means associated with a succeeding intermediate compartment for independently passing steam through the fuel.

Signed by me this 11th day of August, 1922.

CALEB DAVIES, Jr.